(12) United States Patent
Watanabe

(10) Patent No.: US 9,073,218 B2
(45) Date of Patent: Jul. 7, 2015

(54) MULTIPLE JOINTS ROBOT HAVING COVER ON END EFFECTOR ATTACHMENT

(71) Applicant: FANUC CORPORATION, Minamitsuru-gun, Yamanashi (JP)

(72) Inventor: Hideyuki Watanabe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/016,117

(22) Filed: Sep. 1, 2013

(65) Prior Publication Data

US 2014/0060236 A1 Mar. 6, 2014

Related U.S. Application Data

(60) Provisional application No. 61/697,926, filed on Sep. 7, 2012.

(30) Foreign Application Priority Data

Aug. 31, 2012 (JP) ................................. 2012-191281

(51) Int. Cl.
*B25J 17/00* (2006.01)
*B25J 17/02* (2006.01)
*B25J 19/00* (2006.01)

(52) U.S. Cl.
CPC ............ *B25J 17/02* (2013.01); *Y10T 74/20335* (2015.01); *B25J 19/0075* (2013.01)

(58) Field of Classification Search
CPC .................................. B25J 17/02; B25J 18/00
USPC ................. 74/490.01–490.06; 901/19, 25, 29
See application file for complete search history.

(56) References Cited

U.S. PATENT DOCUMENTS

| | | | | |
|---|---|---|---|---|
| 5,931,047 A | * | 8/1999 | Ellqvist et al. | 74/490.01 |
| 6,431,018 B1 | * | 8/2002 | Okada et al. | 74/490.02 |
| 7,841,256 B2 | * | 11/2010 | Hama et al. | 74/490.05 |
| 8,109,170 B2 | * | 2/2012 | Jinushi et al. | 74/490.01 |
| 8,534,155 B2 | * | 9/2013 | Long | 74/490.06 |
| 2010/0331857 A1 | * | 12/2010 | Doyle et al. | 606/130 |
| 2011/0120255 A1 | * | 5/2011 | Chen et al. | 74/490.06 |
| 2011/0126661 A1 | * | 6/2011 | Long | 74/490.05 |
| 2011/0265597 A1 | * | 11/2011 | Long | 74/490.05 |
| 2011/0290060 A1 | * | 12/2011 | Long | 74/490.01 |
| 2012/0048047 A1 | * | 3/2012 | Zhang | 74/425 |

(Continued)

FOREIGN PATENT DOCUMENTS

| | | | |
|---|---|---|---|
| JP | 63-123688 A | 5/1988 | |
| JP | 199585 U | 7/1989 | |

(Continued)

*Primary Examiner* — William Kelleher
*Assistant Examiner* — Zakaria Elahmadi
(74) *Attorney, Agent, or Firm* — Lowe Hauptman & Ham, LLP

(57) ABSTRACT

A multiple joint robot includes a wrist part provided with a reduction gear unit capable of receiving an end effector and of transmitting power to the end effector. The reduction gear unit includes a fixed part fixed to the wrist part by means of a fixing element, a rotational part rotatable relative to the fixed part, and a sealing element provided in a circumference of the rotational part. There is a cover at the fixed part of the reduction gear unit, and the fixing element and the sealing element are covered by the cover. The cover is provided to flatten a convex portion or a concave portion formed by the fixing element.

7 Claims, 10 Drawing Sheets

(56) References Cited

U.S. PATENT DOCUMENTS

| | | | |
|---|---|---|---|
| 2012/0103127 A1* | 5/2012 | Liu | 74/490.06 |
| 2012/0266720 A1* | 10/2012 | Oka et al. | 74/665 H |
| 2014/0007731 A1* | 1/2014 | Hosek et al. | 74/490.06 |

FOREIGN PATENT DOCUMENTS

| | | | |
|---|---|---|---|
| JP | 453692 A | 2/1992 | |
| JP | 752074 A | 2/1995 | |
| JP | 957680 A | 3/1997 | |
| JP | 1133973 A | 2/1999 | |
| JP | 200118186 A | 1/2001 | |
| JP | 2001254787 A | 9/2001 | |
| JP | 200622835 A | 1/2006 | |
| JP | 2006170300 A | 6/2006 | |
| JP | 200855560 A | 3/2008 | |
| JP | 201064219 A | 3/2010 | |
| JP | 201120247 A | 2/2011 | |
| JP | 201131345 A | 2/2011 | |
| JP | 201131365 A | 2/2011 | |
| JP | 201132540 A | 2/2011 | |
| WO | 9617713 A1 | 6/1996 | |

* cited by examiner

US 9,073,218 B2

MULTIPLE JOINTS ROBOT HAVING COVER ON END EFFECTOR ATTACHMENT

RELATED APPLICATIONS

The present application is based on, and claims priority from, Japanese Application Number 2012-191281, filed Aug. 31, 2012, and U.S. Provisional Application No. 61/697,926, filed Sep. 7, 2012 the disclosure of which is hereby incorporated by reference herein in its entirety.

BACKGROUND OF THE INVENTION

1. Field of the Invention

The present invention relates to a multiple joint robot.

2. Description of the Related Art

A multiple joint robot for use in an industrial production line for producing food or medical products or the like must remain hygienic. In order to maintain the hygienic condition, the robot is regularly washed with water or cleaning agents. However, if components of the robot have rough surfaces, foreign objects or cleaning agent residues tend to be attached thereto. In order to prevent it, parts which move relative to each other may be formed into a labyrinth structure. For example, JP-A-63-123688 proposed an industrial robot in which a waterproof structure is provided between a swing table of a driven part and a holder of a fixed part.

A tip portion of an arm is the closest part of the robot to products, and thus it must be particularly kept hygienic. However, an end effector attached to the tip portion of the arm is subject to selection by a user, and thus a configuration thereof varies, depending on an intended application. Accordingly, it is difficult to provide a predetermined labyrinth structure between the tip portion of the arm and the end effector.

There is a need for a multiple joint robot which allows an end effector attachment of the robot to be kept hygienic.

SUMMARY OF THE INVENTION

According to a first aspect, a multiple joint robot comprises an arm, a wrist part provided at a tip end of the arm, a reduction gear unit provided at the wrist part and capable of receiving an end effector and of transmitting power to the end effector, wherein the reduction gear unit includes a fixed part fixed to the wrist part by means of a fixing element, a rotational part rotatable relative to the fixed part, and a sealing element provided in a circumference of the rotational part, and wherein the multiple joint robot further comprises a cover attached to the fixed part of the reduction gear unit, the cover being adapted to cover a convex portion or a concave portion formed on the fixed part by the fixing element and to cover the sealing element so as to prevent the sealing element from being exposed to an exterior.

According to a second aspect, the multiple joint robot according to the first aspect further comprises an elastically deformable sheet interposed between the cover and the reduction gear unit.

According to a third aspect, in the multiple joint robot according to the first or second aspect, the cover is attached to the fixed part of the reduction gear unit by a second fixing element different from the fixing element, and the multiple joint robot further comprises a closing element provided on a second concave portion formed by the second fixing element, the closing element having a complementary shape with the second concave portion so as to close the second concave portion.

These and other objects, features and advantages of the present invention will become more apparent in light of the detailed description of exemplary embodiments thereof as illustrated by the drawings.

DETAILED DESCRIPTION OF THE INVENTION

Embodiments of the present invention will be described with reference to the accompanying drawings. Constituent elements of the illustrated embodiments may be modified in size for better understanding.

Figure 1:
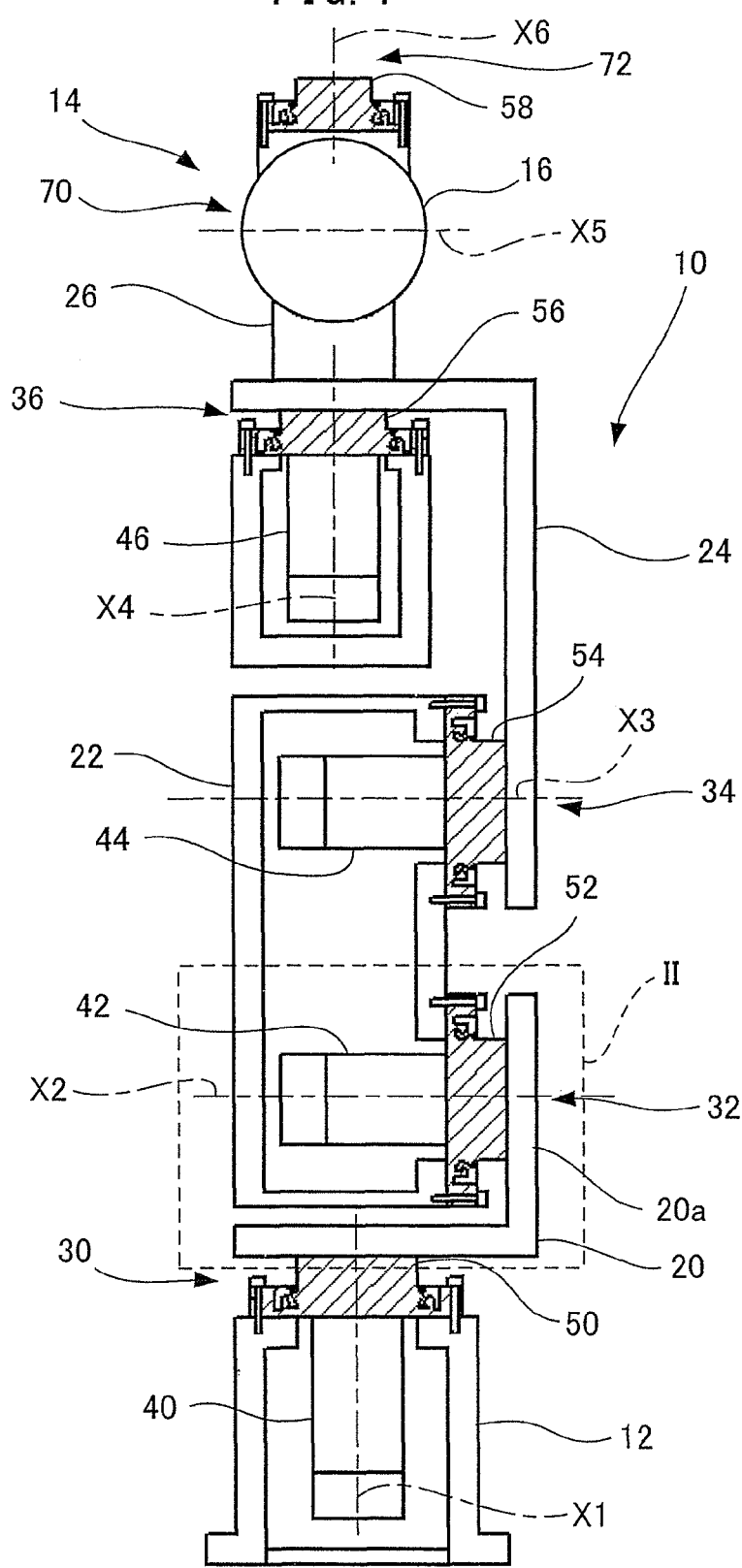
FIG. 1 is a sectional view schematically illustrating an exemplary multiple joint robot to which the present invention can apply.

FIG. 1 is a sectional view schematically illustrating an exemplary multiple joint robot 10 to which the present invention can apply. The multiple joint robot 10 is a generic type industrial robot. The robot 10 includes a base 12 mounted on a mounting surface, a rotational table 20 coupled to the base 12 via a joint 30, a first arm 22 having a base end coupled to an extended portion 20a of the rotational table 20 extending substantially perpendicular to an edge of the rotational table 20 via a joint 32 and a tip end provided with a joint 34, a second arm 24 coupled to the first arm 22 via the joint 34, a third arm 26 coupled to the second arm 24 via a joint 36, and a wrist part 14 provided at a tip end of the third arm 26. The respective joints 30, 32, 34 and 36 are able to rotate around axes X1, X2, X3 and X4 by motors 40, 42, 44 and 46 via reduction gear units 50, 52, 54 and 56, respectively. The configuration and operation of such a multiple joint robot 10 is widely known in the art, and therefore a further description of which will be omitted herein.

Figure 2:
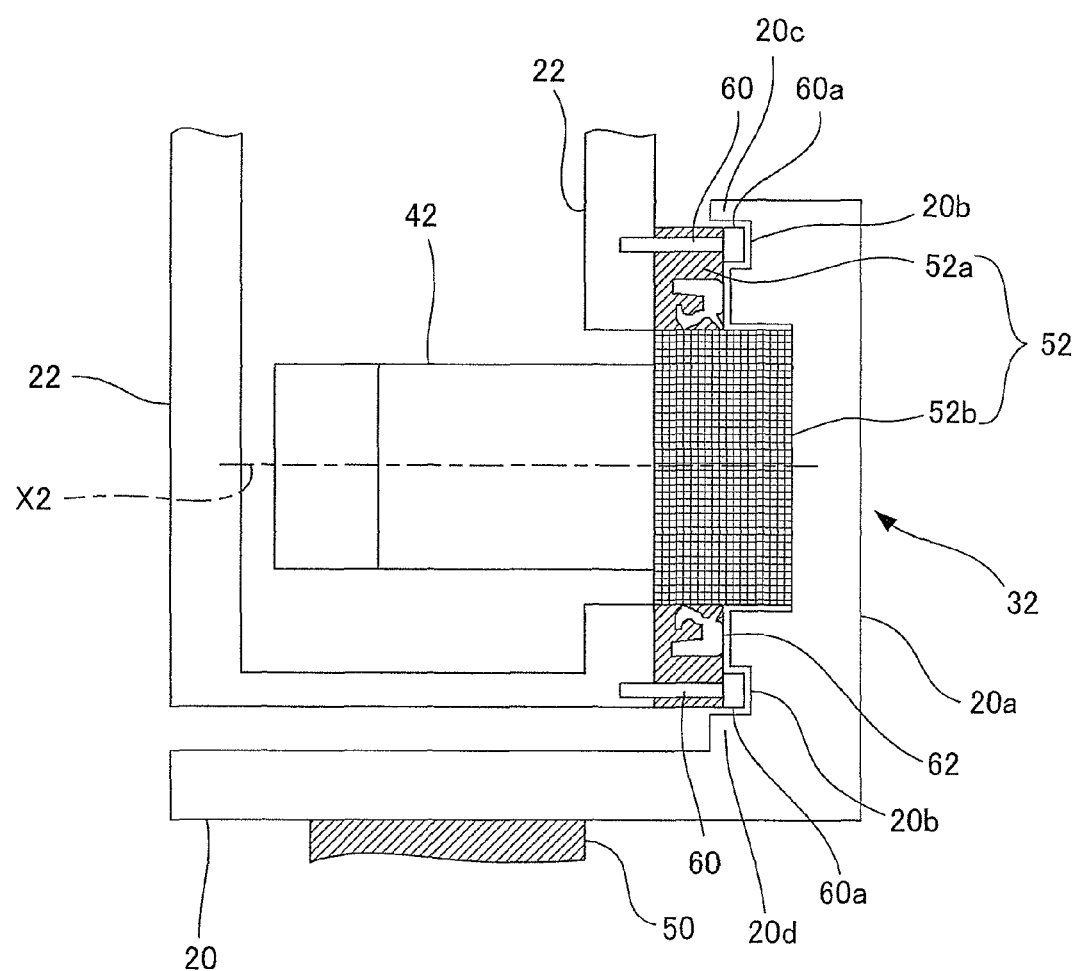
FIG. 2 is a partially enlarged view illustrating a region II shown in FIG. 1.

FIG. 2 is a partially enlarged view illustrating a region II surrounded by a broken line in FIG. 1. Specifically, FIG. 2 shows the joint 32 and its surroundings in an enlarged manner. The reduction gear unit 52 includes a fixed part 52a fixed to the first arm 22 by means of bolts 60, a rotational part 52b rotatable relative to the fixed part 52a, and a ring-like sealing element 62 provided in a circumference of the rotational part 52b. Although not illustrated, the rotational part 52b further includes an input part coupled to an output shaft of the motor 42 so as to rotate in conjunction with the motor 42, and an output part adapted to rotate at a predetermined deceleration ratio relative to the input part. The output part of the reduction gear unit 52 is coupled to the extended portion 20a of the rotational table 20, so that the joint 32 is able to rotate around the axis X2. The sealing element 62 may be a known sealing element which provides dustproofing and/or waterproofing, without hindering rotation of the rotational part 52b of the reduction gear unit 52.

As can be seen in FIG. 2, the extended portion 20a of the rotational table 20 is provided with concave portions 20b on a surface facing head portions 60a of the bolts 60, and the concave portions 20b are depressed toward the opposite sides of the head portions 60a. The concave portions 20b have complementary shapes with the head portions 60a of the bolts 60. The extended portion 20a has an upper edge 20c and a lower edge 20d which extend along side surfaces of the head portions 60a of the bolts 60, respectively. In this way, the extended portion 20a of the rotational table 20 forms a labyrinth structure with the fixed part 52a of the reduction gear unit 52. Such a labyrinth structure allows convex portions formed on the fixed part 52a of the reduction gear unit 52 by the head portions 60a of the bolts 60 to be covered, so that the convex portions are not exposed to the exterior. In other words, the outer surface of the fixed part 52a of the reduction gear unit 52 can be flattened. With a component of the robot 10 having a flat surface, it is advantageous that foreign objects can be prevented from being attached to the surface, and cleaning agents can be prevented from remaining on the surface. The illustrated upper edge 20c and lower edge 20d of the extended portion 20a may be extended along the side surfaces of the bolts 60 even farther, so as to entirely cover the side surface of the fixed part 52a of the reduction gear unit 52.

Further, the sealing element 62 is covered by the extended portion 20a of the rotational table 20, so as not to be exposed to the exterior. Thus, the sealing element 62 can be prevented from being directly exposed to cleaning agents during a process for cleaning the robot 10 at high pressure. This structure can prevent cleaning agents from entering the inside of the reduction gear 52 and also prevent the sealing element 62 from being damaged, so as to maintain a sealing effect by the sealing element 62.

Referring back to FIG. 1, the wrist part 14 provided at a tip end of the third arm 26 farthermost from the base 12 will be described. The wrist part 14 includes a joint 70 rotatable around an axis X5, and a joint 72 rotatable around an axis X6 extending perpendicular to the axis X5. The joint 70 is rotated by a motor via a reduction gear unit. Neither the motor nor the reduction gear unit for the joint 70 is illustrated. The joint 72 is rotated by a motor (not illustrated) via a reduction gear unit 58. The reduction gear unit and the motor which are not illustrated may be accommodated in the inside of a casing 16 which is rotatable around the axis X5. For example, the casing 16 may be provided in the inside of the third arm 26 or at the wrist part 14. The reduction gear unit 58 situated at the tip end of the wrist part 14 functions to transmit power generated by the motor to an end effector (not illustrated). The reduction gear unit 58 also serves as an end effector attachment 80 capable of receiving various end effectors such as gripping means for gripping a workpiece and an operational tool such as a sensor. When an end effector is mounted to the wrist part 14, the end effector is thus adapted to rotate around the axis X6 by the motor via the reduction gear unit 58.

Figure 3:
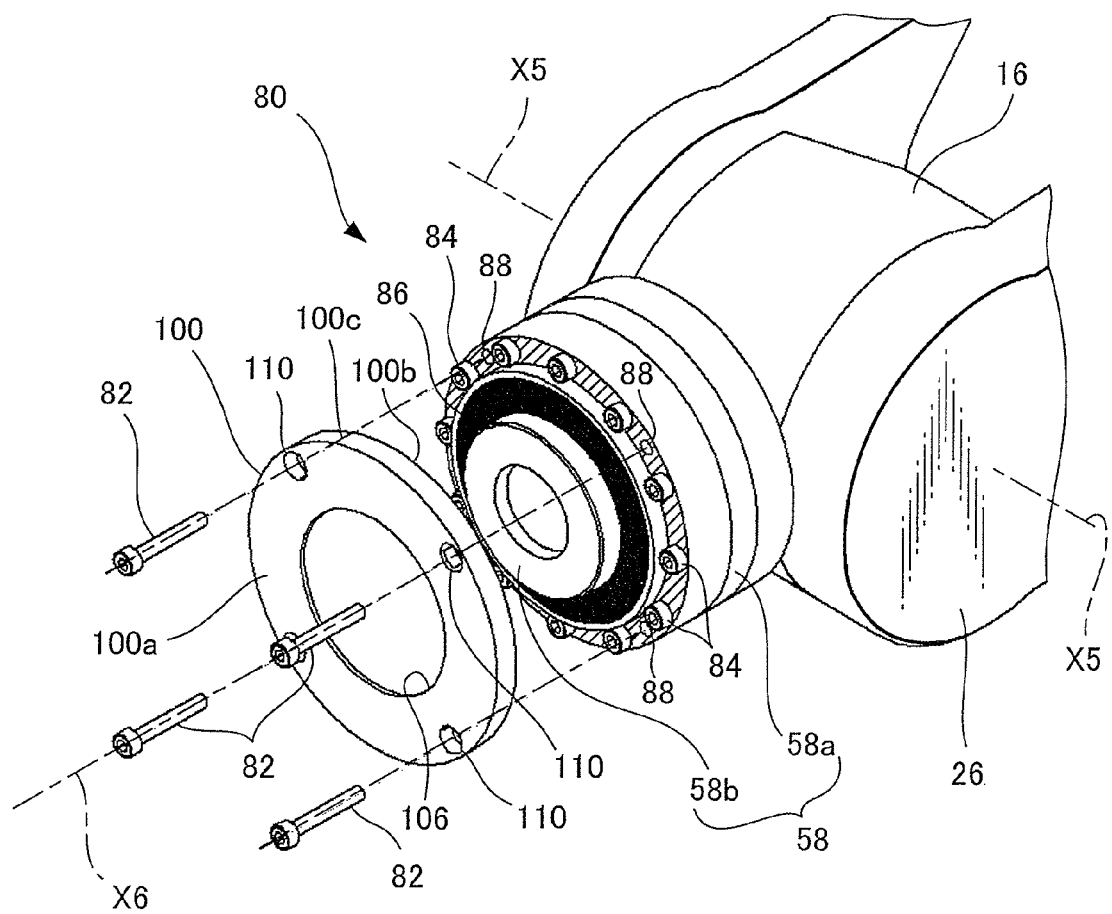
FIG. 3 is an exploded perspective view illustrating an end effector attachment of a robot according to a first embodiment.
Figure 4:
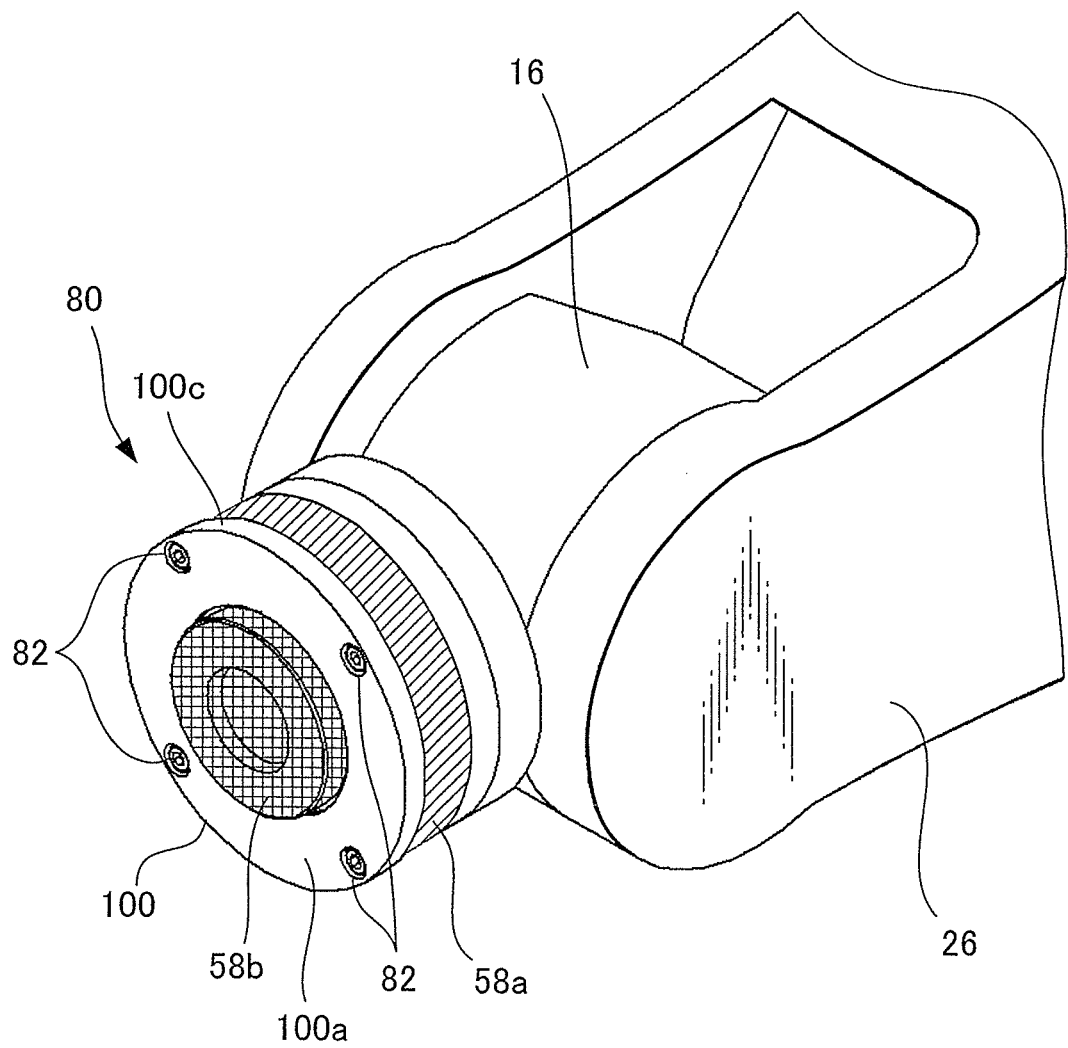
FIG. 4 is a perspective view illustrating the end effector attachment of the robot according to the first embodiment.
Figure 5:
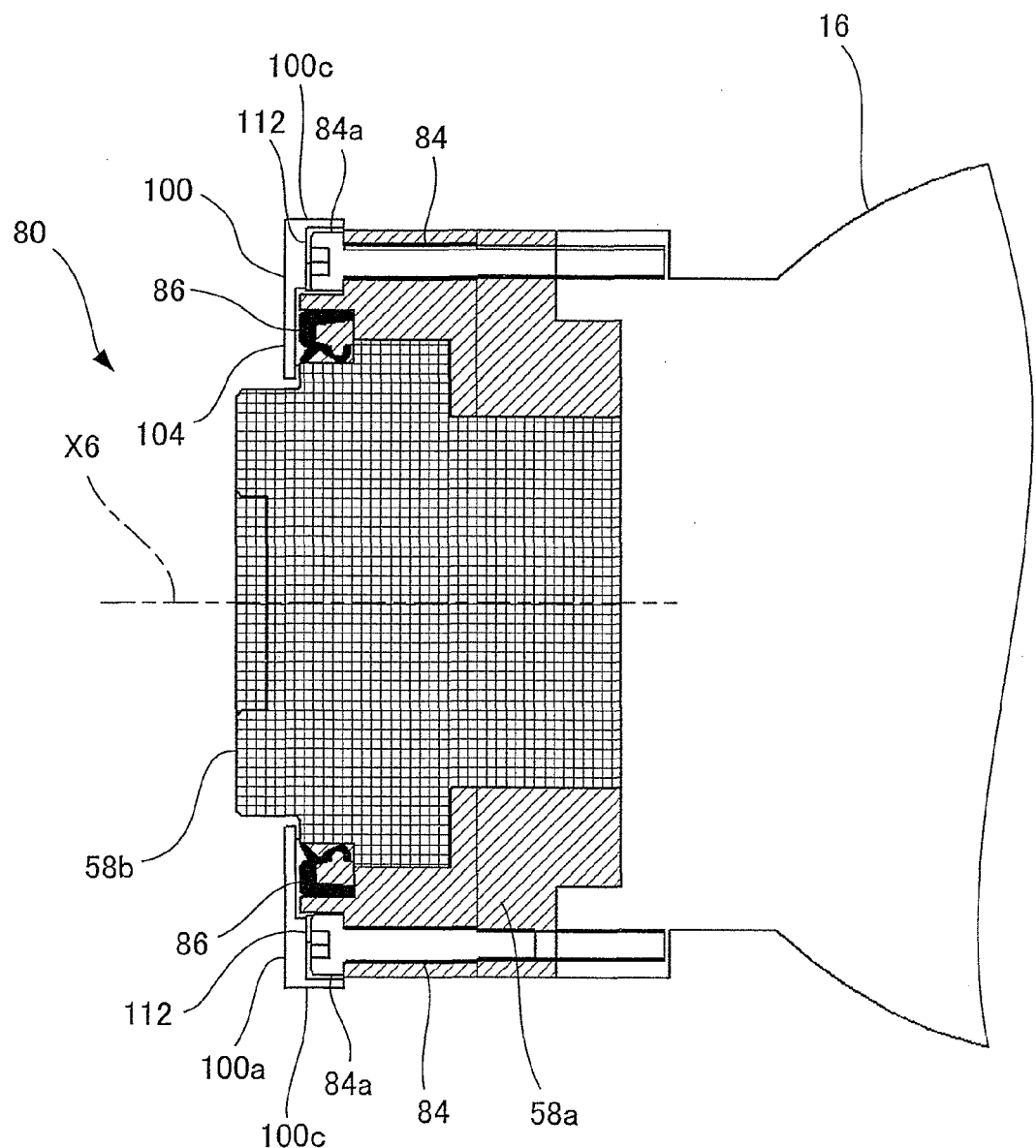
FIG. 5 is a sectional view illustrating the end effector attachment of the robot according to the first embodiment.

FIG. 3 is an exploded perspective view illustrating an end effector attachment 80 of a robot according to a first embodiment, FIG. 4 is a perspective view illustrating the end effector attachment 80, and FIG. 5 is a sectional view illustrating the end effector attachment 80. The end effector attachment 80 includes a reduction gear unit 58 for transmitting power from the motor to the end effector at a predetermined deceleration ratio, and a cover 100 attached to the reduction gear unit 58 by means of four bolts 82.

The reduction gear unit 58 includes a fixed part 58a fixed to the casing 16 by means of fixing elements such as bolts 84, a rotational part 58b rotatable relative to the fixed part 58a, and a sealing element 86 provided in a circumference of the rotational part 58b. The fixed part 58a of the reduction gear unit 58 is fixed by the bolts 84 at several positions spaced apart from each other in a circumferential direction. The fixed part 58a of the reduction gear unit 58 is provided with threaded holes 88 spaced apart from each other in a circumferential direction, so that the threaded holes 88 can receive the bolts 82 in order to secure the cover 100. The sealing element 86 is a ring-like member illustrated as a blackened portion in FIGS. 3 and 5.

Figure 6:
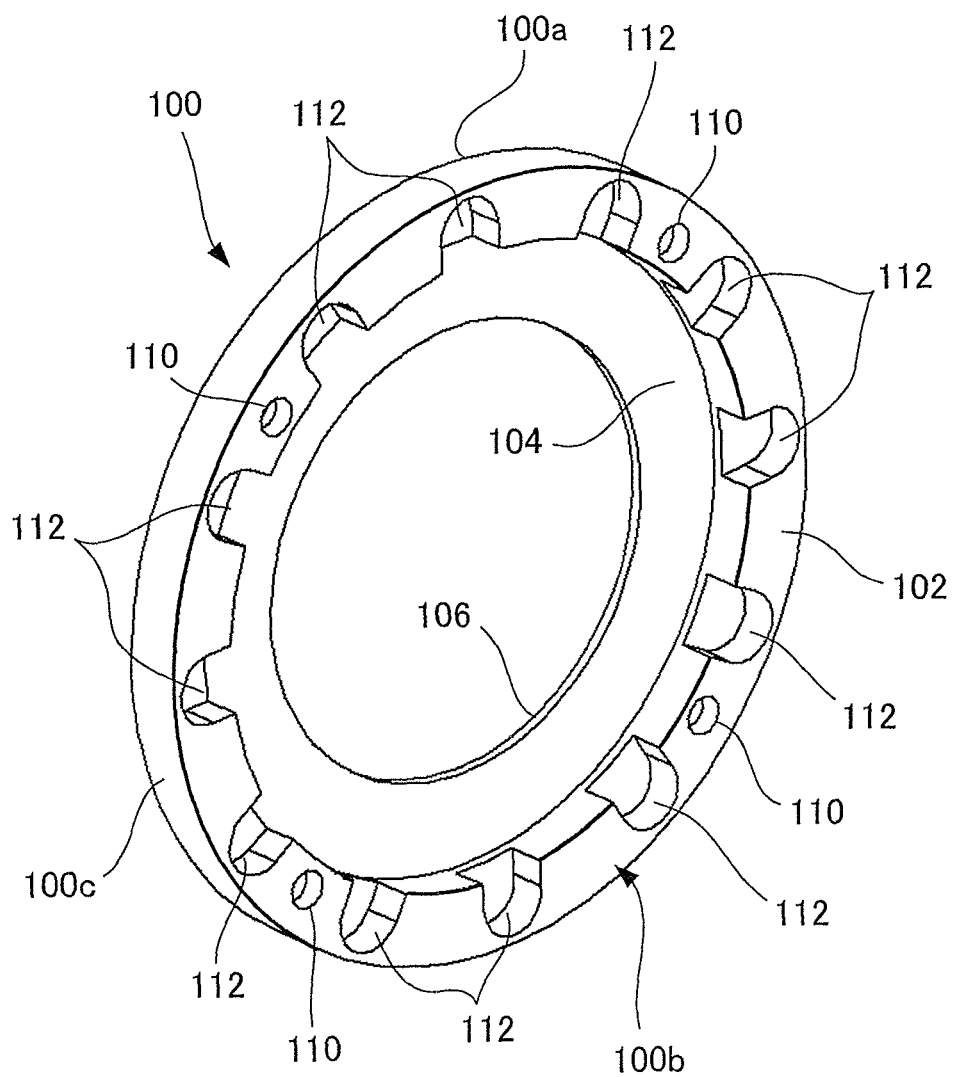
FIG. 6 is a perspective view illustrating a cover attached to the end effector attachment shown in FIGS. 3 to 5.

FIG. 6 is a perspective view illustrating the cover 100 attached to the end effector attachment 80 shown in FIG. 3. FIG. 6 shows the cover 100 seen from its rear surface 100b on the opposite side of a substantially flat surface 100a of the cover 100 which serves as a surface to which an end effector is attached. The cover 100 has an outer circumferential surface 100c having a circular contour. The cover 100 is a ring-like member including an outer circumferential portion 102 extending radially inwardly from the outer circumferential surface 100c, and an inner circumferential portion 104 depressed toward the surface 100a and having a thickness thinner than the outer circumferential portion 102. The inner circumferential portion 104 is provided at its central portion with a central bore 106, through which the rotational part 58b of the reduction gear unit 58 can extend out. The outer circumferential portion 102 is provided with through holes 110 spaced apart from each other in a circumferential direction, so that the bolts 82 for fixing the cover 100 to the reduction gear unit 58 are inserted through these through holes 110. The outer circumferential portion 102 of the cover 100 is also provided with several concave portions 112 spaced apart from each other in a circumferential direction. The concave portions 112 are situated in position, corresponding to the bolts 84 used for fixing the reduction gear unit 58 to the casing 16. The respective concave portions 112 are depressed toward the opposite side of the head portions 84a of the bolts 84, so as to have a complementary shape with the corresponding head portion 84a. In this way, when the cover 100 is attached to the end effector attachment 80, the head portions 84a of the bolts 84 protruding from the fixed part 58a of the reduction gear unit 58 are housed within the concave portions 112.

As shown in FIGS. 4 and 5, an outer surface of the fixed part 58a is covered by the cover 100, when the cover 100 is attached to the reduction gear unit 58. On the other hand, the rotational part 58b of the reduction gear unit 58 extends out of the central bore 106 of the cover 100. In addition, the circumferential surface 100c of the cover 100 extends up to the side surfaces of the head portions 84a of the bolts 84, as shown in FIG. 5. This allows the side surfaces of the head portions 84a of the bolts 84 to be covered by the cover 100. In this way, protruding portions of the bolts 84, which protrude from the reduction gear unit 58 to the exterior, are covered by the cover 100. The surface 100a and the outer circumferential surface 100c of the cover 100 exposed to the exterior are substantially flat and/or smooth. More particularly, the surface 100a of the cover 100 is flat except for portions where the bolts 82 are attached as shown in FIG. 4. Therefore, concave portions/convex portions formed on the surface of the end effector attachment 80 exposed to the exterior can be minimized. According to the robot 10 in the present embodiment, even though the surface of the fixed part 58a of the reduction gear unit 58 is formed with convex portions by the bolts 84, the surface exposed to the exterior remains flat and/or smooth with the aid of the cover 100. Thus, foreign objects can be prevented from being attached to the surface of the end effector attachment 80 and cleaning agents can be prevented from remaining on the surface.

Also can be seen in FIG. 5, the inner circumferential portion 104 of the cover 100 covers the outer surface of the sealing element 86 provided around the rotational part 58*b* of the reduction gear unit 58. This can prevent the sealing element 86 from being directly exposed to highly-pressurized cleaning agents during a cleaning process of the robot 10, for example. As a result, cleaning agents can be prevented from passing through the sealing element 86 and from entering the inside of the reduction gear unit 58. In addition, the sealing element 86 can be prevented from being damaged due to pressure of the cleaning agents. Further, the sealing element 86 can also be prevented from directly contacting foreign objects. Accordingly, enhanced durability of the sealing element 86 can be achieved and it can be ensured that the sealing element 86 remains hygienic.

In the illustrated embodiment, the head portions 84*a* of the bolts 84 protrude from the fixed part 58*a* of the reduction gear unit 58. However, the present embodiment may also apply to the case where concave portions are formed on the surface of the fixed part 58*a* as a result of the fixed part 58*a* of the reduction gear unit 58 being fixed to the casing 16 by the bolt 84. In this case, instead of the concave portions 112 formed on the outer circumferential portion 102 of the cover 102, the cover 100 may be modified so as to have protrusions protruding toward the opposite side of the surface 100*a* of the cover 100. With the protrusions accommodated within the concave portions formed by the bolts 84, the surface of the end effector attachment 80 can be flattened.

It is difficult to form an end effector attachment into a labyrinth structure, unlike an assembled structure between the arm and the reduction gear unit described above with reference to FIG. 2. Specifically, it is difficult to provide for a predetermined labyrinth structure, since a shape of end effector may vary, depending on a type of end effector selected by a user. In contrast, according to the present embodiment, by the cover which makes the surface of the end effector attachment flat and/or smooth, foreign objects can be prevented from being attached to the surface of the end effector attachment and cleaning agents can be prevented from remaining on the surface. Further, the sealing element can be prevented from being damaged. Therefore, a reliable robot which remains hygienic can be provided.

Next, other embodiments will be described. In the following, matters which have already been described will be omitted from the explanation. Like elements are designated with the same referential numerals.

Figure 7:
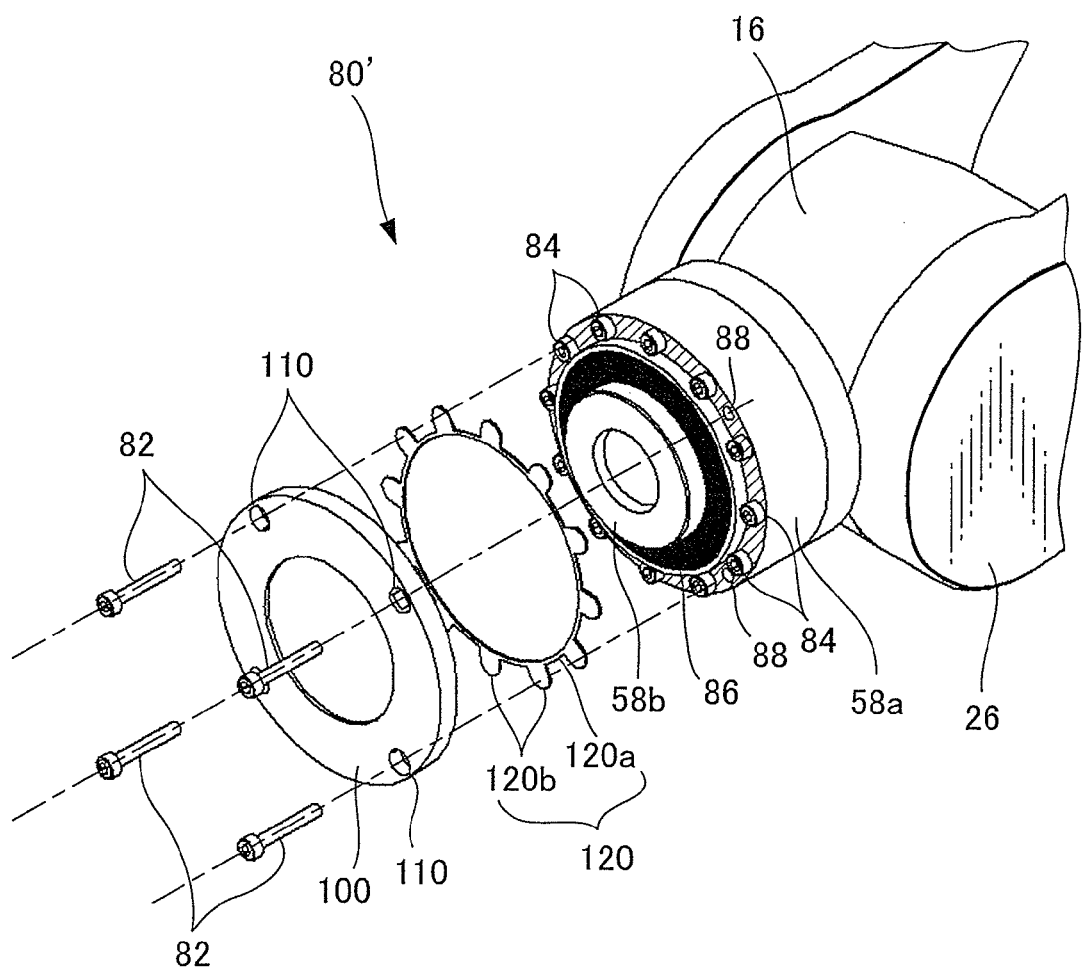
FIG. 7 is an exploded perspective view illustrating an end effector attachment according to a second embodiment.
Figure 8:
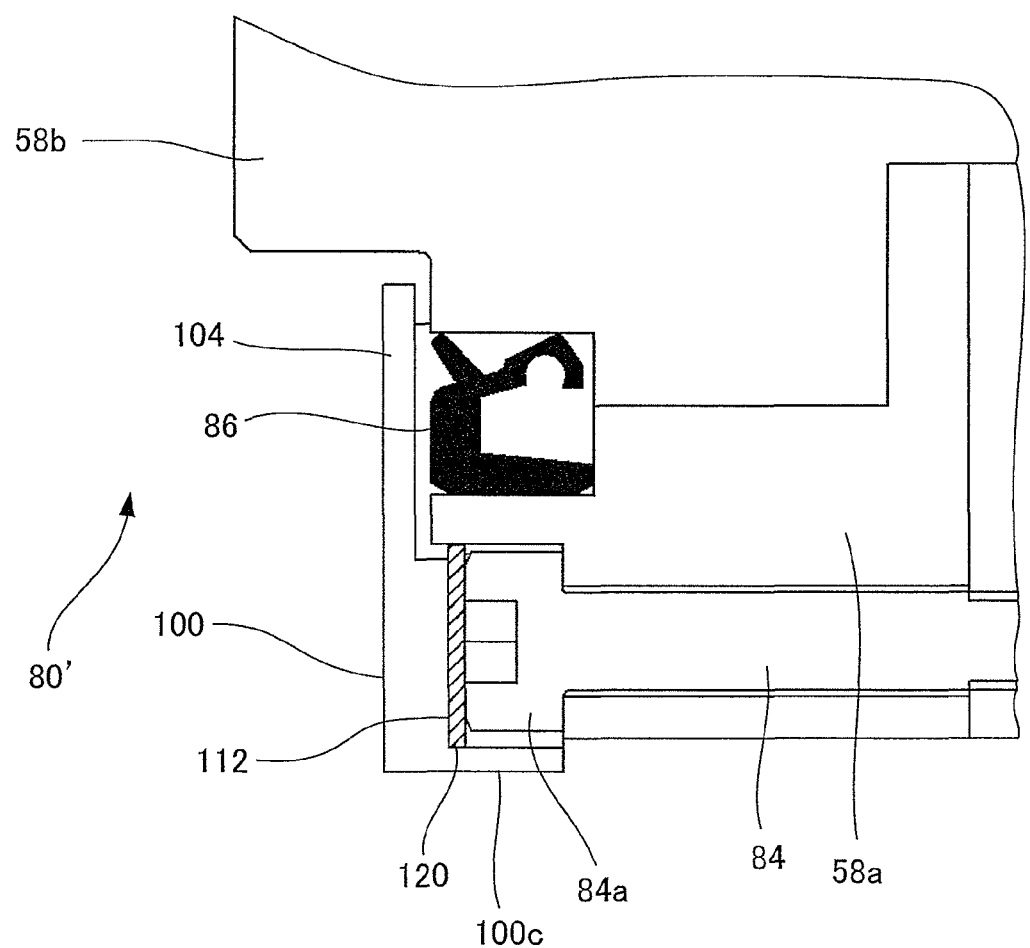
FIG. 8 is a sectional view illustrating the end effector attachment according to the second embodiment.

FIG. 7 is an exploded perspective view illustrating an end effector attachment 80' according to a second embodiment, and FIG. 8 is a sectional view illustrating the end effector attachment 80'. In the present embodiment, an elastically deformable sheet 120 is provided between the reduction gear unit 58 and the cover 100. The sheet 120 has a ring-like sheet body 120*a* and protruding portions 120*b* protruding from the sheet body 120*a* radially outwardly substantially in an inversed U-shape. The sheet body 120*a* is provided concentrically with the rotational part 58*b* of the reduction gear unit 58. The protruding portions 120*b* of the same number as that of the bolts 84 are provided so as to be spaced apart from each other in the same way as the bolts 84. The respective protruding portions 120*b* are positioned so as to extend over the outer surfaces of the head portions 84*a* of the bolts 84 when the sheet 120 and the cover 100 are assembled to the reduction gear unit 58 (see FIG. 8).

The sheet 120 is subject to compressive force acting in its thickness direction by the bolts 82 for fixing the cover 100 to the reduction gear unit 58. Thus, the sheet 120 in a compressed state provides a sealing effect due to its restorative force, so as to tightly close gaps between the reduction gear unit 58 and the bolts 84. According to the present embodiment, the gaps between the reduction gear unit 58 and the bolts 84 are closed by the sheet 120, and therefore, foreign objects can be prevented from entering the inside of the reduction gear unit 58 through such gaps, or from being collected in the gaps.

Figure 9:
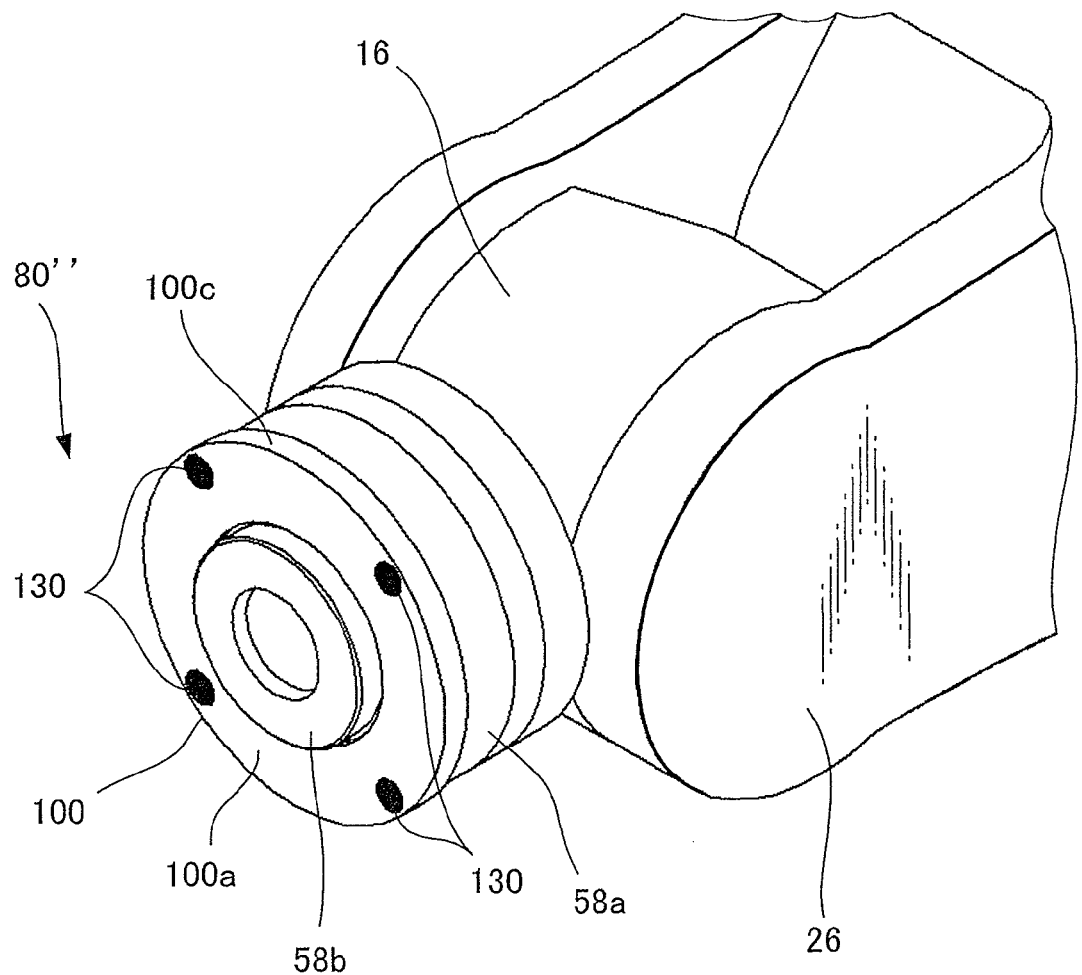
FIG. 9 is a perspective view illustrating an end effector attachment according to a third embodiment.
Figure 10:
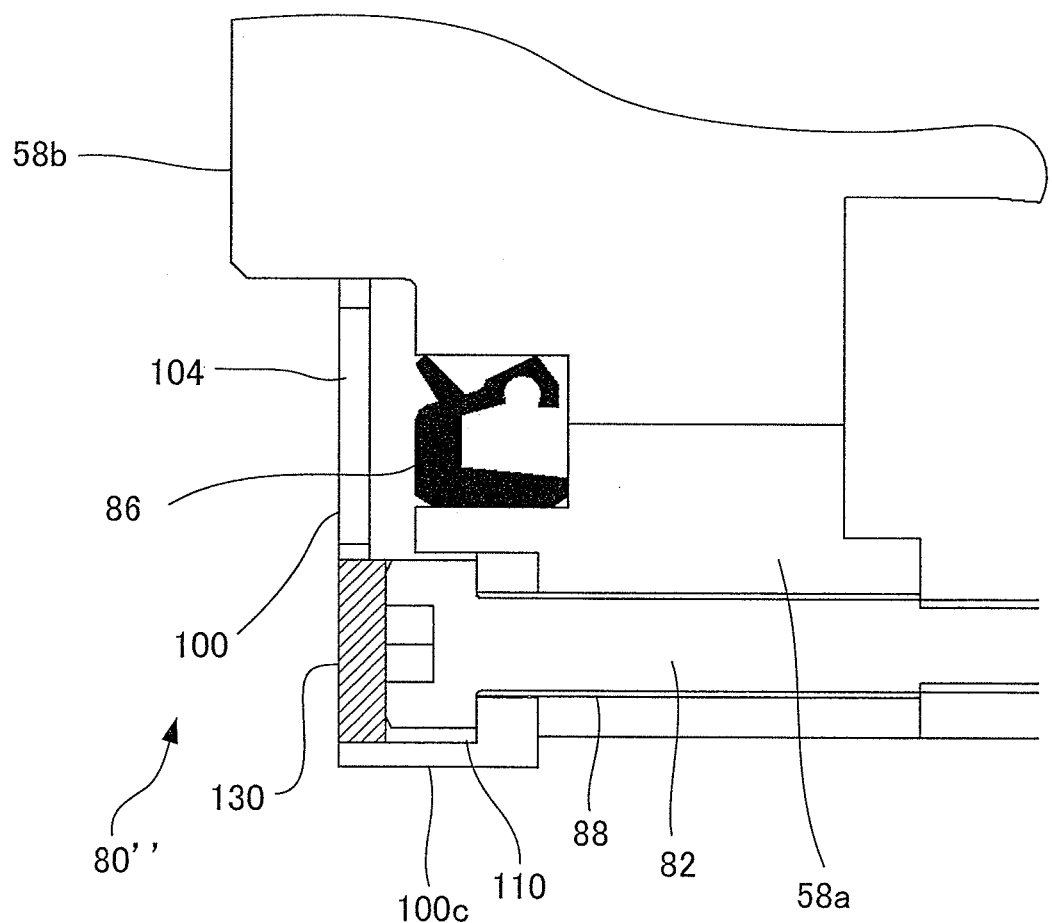
FIG. 10 is a sectional view illustrating the end effector attachment according to the third embodiment.

FIG. 9 is a perspective view illustrating an end effector attachment 80" according to a third embodiment, and FIG. 10 is a sectional view illustrating the end effector attachment 80". As can be seen in comparison of FIG. 9 with FIG. 4, in the present embodiment, concave portions formed by the bolts 82 which are inserted to the through holes 110 of the cover 100 are closed by closing elements 130. The closing elements 130 are provided on the concave portions, for example, by adhesive. The closing elements 130 have complementary shapes with the concave portions, so as to close the concave portions and to flatten the surface 100*a* of the cover 100. In this way, the concave portions formed by the bolts 82 can be flattened. This prevents foreign objects from being attached to the concave portions and prevents cleaning agents from remaining in the concave portions. As an alternative to the closing element 130, sealing agents may be injected to the concave portions in order to close the concave portions.

Although various embodiments of the present invention have been described, it is evident to a person skilled in the art that the present invention can also be implemented by any combination of features of the embodiments either explicitly or implicitly disclosed herein.

EFFECT OF THE INVENTION

According to the first aspect, the convex portion or the concave portion formed by the fixing element for fixing the reduction gear unit is covered by the cover attached to the reduction gear unit, so as to flatten the surface of the end effector attachment. Thus, foreign objects can be prevented from being attached to the end effector attachment and cleaning agents can be prevented from remaining on the end effector attachment. Further, according to the first aspect, the sealing element is covered by the cover, so as not to be exposed to the exterior. Thus, the sealing element can be prevented from being damaged due to direct exposure to highly-pressurized cleaning agents during a cleaning process. Furthermore, the sealing element can be prevented from being directly contacted by foreign objects.

According to the second aspect, the elastically deformable sheet is provided between the cover and the reduction gear unit in a compressed state by fastening force for attaching the cover to the reduction gear unit. The sheet allows a gap between the cover and the reduction gear unit to be tightly closed under influence of restorative force of the sheet. Therefore, foreign objects can be prevented from entering the inside of the reduction gear unit through the gap and from being collected in the gap.

According to the third aspect, the concave portion formed by the second fixing element for attaching the cover to the reduction gear unit is closed by the closing element, so as to flatten the surface of the cover. Therefore, foreign objects can be prevented from being attached to the surface of the cover and cleaning agents can be prevented from remaining on the surface of the cover.

Although the invention has been shown and described with exemplary embodiments thereof, it should be understood by those skilled in the art that the foregoing and various other changes, omissions and additions may be made therein and thereto without departing from the spirit and scope of the invention.

The invention claimed is:

1. A multiple joint robot, comprising:
an arm,
a wrist part provided at a tip end of the arm, and
a reduction gear unit provided at the wrist part and capable of receiving an end effector and of transmitting power to the end effector,
wherein the reduction gear unit includes
a fixed part fixed to the wrist part by a fixing element,
a rotational part rotatable relative to the fixed part, and
a sealing element provided in a circumference of the rotational part,
wherein
the multiple joint robot further comprises a cover attached to the fixed part of the reduction gear unit, the cover being adapted to cover a convex portion or a concave portion formed on the fixed part by the fixing element and to cover the sealing element so as to prevent the sealing element from being exposed to an exterior,
the cover is a ring-shaped member including an outer circumferential portion and an inner circumferential portion, and
a thickness of the inner circumferential portion is less than a thickness of the outer circumferential portion.

2. The multiple joint robot according to claim 1, further comprising an elastically deformable sheet interposed between the cover and the reduction gear unit.

3. The multiple joint robot according to claim 1,
wherein the cover is attached to the fixed part of the reduction gear unit by a second fixing element different from the fixing element, and
wherein the multiple joint robot further comprises a closing element provided on a second concave portion formed by the second fixing element, the closing element having a complementary shape with the second concave portion so as to close the second concave portion.

4. The multiple joint robot according to claim 1, wherein
the outer circumferential portion includes through holes spaced apart from each other in a circumferential direction of the rotational part, and
a second fixing element different from the fixing element is inserted through each of the through holes to fix the cover to the reduction gear unit.

5. The multiple joint robot according to claim 1, wherein the outer circumferential portion includes a concave portion positioned corresponding to the fixing element so that a head portion of the fixing element is housed within the concave portion.

6. The multiple joint robot according to claim 1, wherein
the cover further includes a flat, front surface to which the end effector is configured to be attached, and a rear surface opposite to the front surface, and
the inner circumferential portion is depressed toward the front surface.

7. The multiple joint robot according to claim 6, wherein the cover further includes, at the outer circumferential portion, an outer circumferential surface connecting the front and rear surfaces and covering a side of the fixing element.

* * * * *